Aug. 13, 1963  D. H. DENNIS  3,100,454
HIGH SPEED GROUND TRANSPORTATION SYSTEM
Filed Sept. 27, 1961
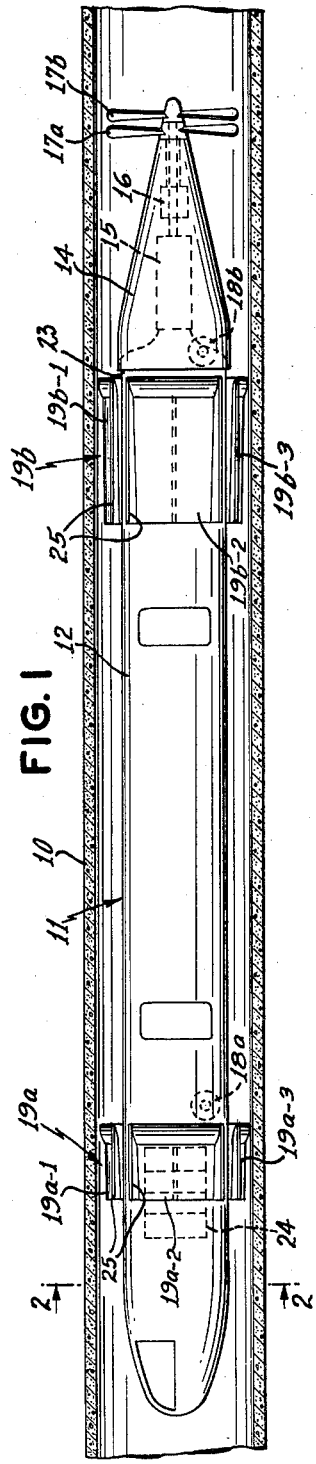
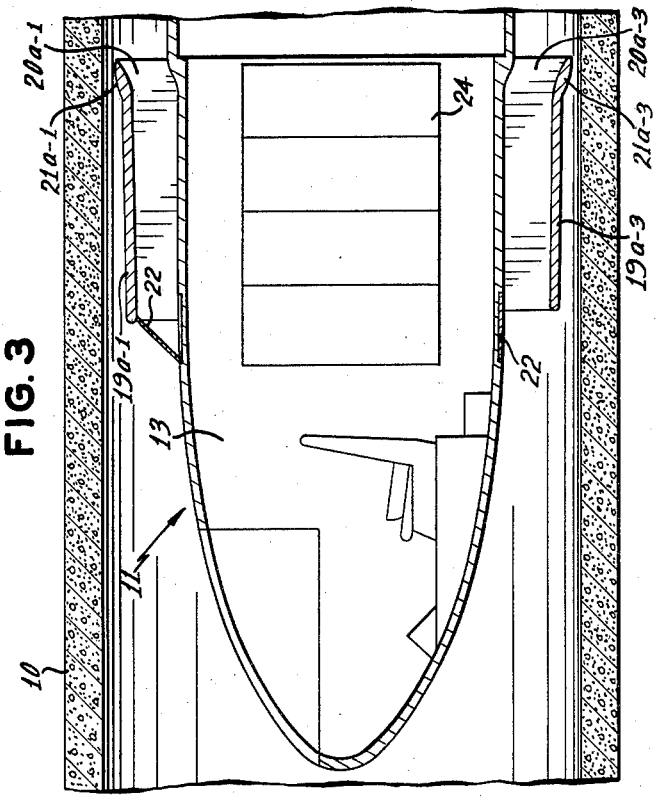
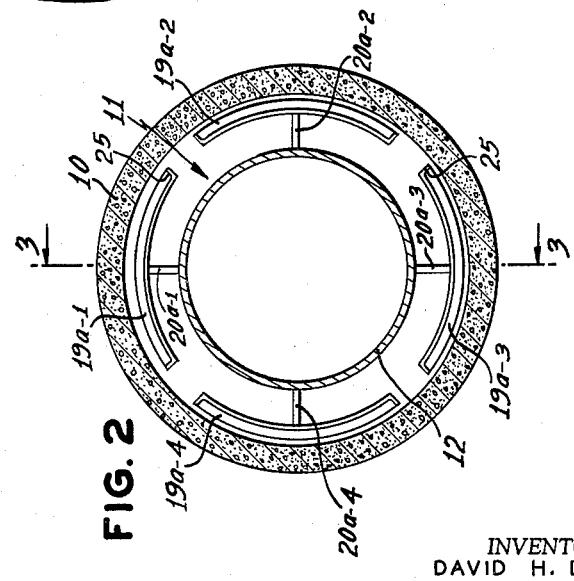
INVENTOR.
DAVID H. DENNIS
BY
*James A. Eisenman*
ATTORNEY 3,100,454
HIGH SPEED GROUND TRANSPORTATION SYSTEM
David H. Dennis, 3 Thackeray Drive, Short Hills, N.J.
Filed Sept. 27, 1961, Ser. No. 143,005
18 Claims. (Cl. 104—138)

This invention relates to high speed ground transportation. More particularly, the invention is concerned with an aerodynamically supported ground-coupled vehicle and track system in which desirable features of both free airborne flight and conventional surface transportation inhere.

Because air transportation traffic density in some large metropolitan areas is rapidly approaching the limit consistent with accepted safety standards, there has been generated a demand for additional airport facilities, which are necessarily being located at progressively increasing distances from the population centers. The speed and other advantages of air transportation diminish rapidly, however, as a function of the distance from the population centers to the airports. Particularly is this true for relatively short flights in which the flight time between terminals might be in the vicinity of say one hour, while the ground travel time to and from the airports ranges from one to three times the flying time. Also, schedule reliability for aircraft and their connecting ground-based carrier vehicles remains largely dependent on the weather.

The present invention has as one of its objects, therefore, to provide a new and improved high speed transportation system.

Another object of the invention is to provide a high speed transportation system in which the speeds of conventional aircraft flight are attainable without attendant risks which result from malfunctions of equipment or errors in judgment of personnel.

Another object of the invention is to provide a high speed transportation system which is virtually immune to adverse weather conditions.

Another object of the invention is to provide a high speed transportation system for operation in populated areas in which the noise level which normally accompanies high velocities and high thrust mechanisms is effectively shielded.

Another object of the invention is to provide a high speed transportation system which can be used both to connect centers of large cities with remotely located airport facilities and to connect cities center to center.

Still another object of the invention is to provide a high speed of transportation system in which the vehicle becomes airborne but is nevertheless guided in its flight by a continuous, fixed track or support so that the typically high level of skill and instrumentation required for piloting aircraft are not required.

Still another object of the invention is to provide a high speed transportation system, the vehicles of which are capable of both flying at high velocities and moving at low velocities by means of more conventional wheel transportation, so that extremely high safety factors are attainable and so that the system can be coupled into existing terminal or station facilities located in downtown metropolitan areas.

Still another object of the invention is to provide a high speed transportation system in which the vehicles automatically assume the correct angle of bank for any given turn, as a function of the linear velocity, and the track for which can accommodate a full range of angular positions of the vehicles.

In accordance with the present invention there is provided a transportation system including a continuous, tubular track preferably of circular cross section with substantially uniform inside dimensions. The track can take the form, for example, of a reinforced concrete pipe laid as a tunnel in a shallow surface trench and covered with backfill so as to be invisible on and acoustically isolated from the surface. Such track can be laid, for example, in the shoulders or dividing strips of present day expressways and railroad rights-of-way. It can be deeply entrenched for complete isolation and to pass beneath waterways.

The vehicle which operates in the tunnel track can take the form of an elongated fuselage, similar for example to that of conventional aircraft, carrying girthwise on its outer surfaces an array of curvilinear airfoils, either continuous or segmented. The outside diameter of the airfoil assemblies is somewhat less than the inside diameter of the tunnel track, the difference being, for example, on the order of one foot. The airfoils are preferably symmetrically arranged about the fuselage, so that when accelerated by its prime mover to a sufficiently high velocity the vehicle will become stably suspended by means of its airfoils within the track by a combination of airfoil functions including so called ground effect, whereby the lift of any given airfoil section decreases as a function of its distance from the inside surface of the tunnel track. Thus in flight the vehicle center line will normally assume a position in the tunnel slightly below the center line of the tunnel. Ground effect is, broadly, a phenomenon known in the aerodynamic arts. It is sometimes perceptible, though often not desirable, in conventional aircraft as the wings move close to the ground during take-off and landing. It has in the past also been proposed that the effect be utilized to sustain continuous flight in close proximity to the ground, but the intricate combination of manual aerodynamic control for guidance and ground effect for lift has rendered it totally impractical with the possible exception of operation over smooth barren wastelands where lateral guidance is less critical. It should also be understood that ground effect as applied in the present invention is not related to so-called ground effect machines which gain lift forces from downwardly directed, motor impelled airstreams, whether the lift be a fraction of an inch as in vehicles which ride over precision rails on an airfilm or whether the lift be on the order of several inches as in the case of machines having high powered downwardly directed fans which are capable of sustaining a vertical position without lateral or forward motion. The true ground effect, as proposed in the present invention, is that which is produced by the forward motion of the vehicle through an air mass. The invention is based on the utilization of the ground effect to generate lift forces with components in both vertical and horizontal planes so that the guidance of the vehicle as well as its support derive from its aerodynamic ground coupling.

The airfoil array preferably takes the form of a forwardly tapered or conical group of foil segments in which the trailing edges are flared outward. The foils operate under extremely high loading, or several times conventional aircraft wing loading, this being possible because of the relatively high aerodynamic pressure differentials developed by the ground effect. This is true even at the near-zero angle of attack of the individual airfoil segments. The individual airfoil segments are mounted to the fuselage in fixed relationship thereto and with radial symmetry about the fuselage, in the illustrated embodiment. Thus the net angle of attack of the array of airfoils is always nominally zero and aerodynamic stalling is absolutely precluded. Additional lift at low vehicle velocities is achieved in accordance with the invention by means of movable members disposed at the forward edges of the airfoils to partially or completely close the axial airflow path between the foils and the fuselage. The vehicle is also furnished with a ground-support system such as a retractable landing gear on which it operates within its tubular track when the velocity is less than that necessary to maintain its airborne condition, and if desired the landing gear can take the form of flanged, railroad type wheels which would enable it to run on conventional railroad tracks into existing railroad stations in metropolitan areas.

The guidance of the vehicle within its tunnel track is entirely automatic, that is, track controlled in both the vertical and horizontal planes and does not depend on the proper functioning of any control mechanism or instruments on the vehicle and is accomplished without physical contact between the vehicle and the tube wall. Guidance is accomplished entirely by aerodynamic forces which depend inversely on the clearance between each fixed airfoil segment and its adjacent region of the inner wall of the tube. The vehicle is so arranged that its center of gravity is normally disposed along an axis below the center line of the vehicle, so that the vehicle is automatically caused to roll about its longitudinal axis to the proper angle of bank for making comfortably coordinated turns at all velocities under which the vehicle is airborne.

The above and other features and objects of the present invention will be apparent from the following specification describing one preferred arrangement and taken in conjunction with the accompanying drawing, in which;

FIGURE 1 is a view in longitudinal section through the track tunnel of the present invention and showing, positioned therein in aerodynamic flight, an airfoil supported vehicle as seen in side elevation;

FIGURE 2 is a view in transverse section taken on the line 2—2 of FIGURE 1, looking in the direction of the arrows; and FIGURE 3 is an enlarged fragmentary view taken on the line 3—3 of FIGURE 2, looking in the direction of the arrows and showing the forward end of the vehicle including the forward set of airfoils in flying attitude.

Referring to the drawing, the invention is illustrated as embodied in a ground-coupled or based transportation system including, as its basic elements, a continuous track 10 taking the form of a circular tube, and, disposed within the tube a vehicle 11, which in the illustrated arrangement is aerodynamically coupled to the tunnel track in the process of high velocity flight therethrough. It will be understood that the track 10 can be formed of a wide range of materials and can be disposed in a wide range of positions in or on the ground. A preferred arrangement, for example, involves the use of a reinforced concrete track of circular cross section and uniform internal diameter laid in a shallow trench and backfilled with dirt so as to be invisible from the surface and partially acoustically isolated therefrom.

The vehicle 11 preferably takes the form of a fuselage 12, generally similar to that of a conventional aircraft having a centrally located passenger compartment, a forwardly located piloting or operating compartment 13, and a rearwardly located propulsion system 14, housed in a rearwardly tapered afterbody or diffuser cone and which can take the form, for example, of a gas turbine engine 15, coupled through a suitable transmission assembly 16 to a pair of counterrotating propellers 17a and 17b. The diffuser cone or tapered afterbody of the fuselage is designed to decelerate the air stream efficiently, that is convert the dynamic velocity head to a static pressure head. Thus the diffuser cone decelerates the air stream which has a high velocity at the maximum fuselage diameter down to the nominal vehicle velocity relative to the vehicle (or nominal zero velocity relative to the tube wall) at the extreme aft end of the vehicle. Fuel is supplied to the engine from a tank (not shown). Auxiliary equipment, identified generally by the numeral 24, is located rearwardly of the operator's compartment 13.

For low velocity operation, the vehicle carries retractable landing gear, including wheels 18a and 18b located fore and aft, respectively, shown in retracted position. The wheels can take the form of rubber-tired wheels capable of running on the lower tunnel track surface and if desired, they can include flanged wheels capable of operating on conventional railroad tracks so that the vehicle can be operated on conventional railroad facilities to and within existing stations and terminals within populated areas. For this purpose, if aerodynamic propulsion is unsuitable for terminal operation, supplementary traction drive means for the wheels can be included in the vehicle 10, or the vehicle can be coupled with an independent locomotive vehicle.

To sustain its aerodynamic flight, the vehicle includes fore and aft airfoil assemblies 19a and 19b, respectively. The airfoil assemblies 19a and 19b are substantially identical, and each can take the form of an array of girthwise-arranged segments as best seen in FIGURE 2, and identified by the numerals 19a–1, 19a–2, 19a–3 and 19a–4, secured to the fuselage 12 by means of struts 20a–1, 20a–2, 20a–3 and 20a–4, respectively. As best seen in FIGURES 2 and 3, the airfoil arrays take the form, in the illustrated arrangement, of curvilinear segments pitched slightly inwardly in the direction of flight and terminating at the trailing edges in outwardly extending flares 21a–1 . . . 21a–4. Fences 25 extend outward from the longitudinal edges of the airfoil segments to block or impede vortex air flow components around the edges.

The airfoils are designed for relatively high loadings on the order of two to three times the loading of conventional aircraft. It should be noted that loadings of the order involved in the present invention do not result in aerodynamic stall because the airfoil segments always act at near-zero angle of attack. It will be observed also that the airfoils establish a curved duct between the inner surfaces of the airfoils and the outer surface of the fuselage as well as the annular space between the outer surfaces of the airfoils and the inside surface of the tunnel track. The airfoils therefore achieve a high degree of lift imparted to the fuselage and deriving from the so-called ground effect which results from the proximity of the airfoils to the tunnel track. Before becoming airborne, the lower airfoils 19a–3 and 19b–3 will be relatively closer to the tunnel wall than the upper airfoils 19a–1 and 19b–1. Because the lift due to ground effect is inversely related to the magnitude of the distance between the airfoil and adjacent region of the tube wall, the vehicle will, as it attains flying velocity, lift to a position in the tunnel to a point at which the upward lift of the lower airfoils is equal to the weight of the vehicle plus the downward thrust or lift of the upper airfoils. The laterally paired airfoil segments 19a–2 and 19a–4 will exert substantially equal and oppositely directed horizontal lift forces tending to center the vehicle horizontally in its tunnel track in the condition of straight flight. In the event of a lateral acceleration in any direction it will be understood that the airfoil segment leading in the direction of lateral motion will incur increased lift as it approaches the proximate wall, while the trailing or opposite airfoils will undergo decreased lft, thereby offsetting the lateral acceleration or displacement, and tending to drive the vehicle towards the tube center or stable flying position.

In order to sustain the required lift at decreased velocities for purposes of take-off and landing, segmented movable members 22 (FIGURE 3) are provided to block or partially block the duct spaces between the airfoils and the fuselage. These segments are disposed completely around the girth of the fuselage at the leading edges of both the forward airfoil array 19a and the aft airfoil array 19b. For clarity of illustration the upper segment in FIGURE 3 is shown in the extended position and the lower segment is shown in the retracted position. It will be understood, however, that all segments, including both forward and aft, always extend or retract in unison. In a preferred arrangement, these segments are hinged at their forward edges to the fuselage and are swung outward by suitable actuating mechanism (not shown). It should be noted that unlike the flap functions on conventional aircraft, the extension of the movable segments into the duct spaces in the present vehicle in no way affects the guidance function of the vehicle. The primary function of movable segments is to control the flow area within the annular duct spaces between the airfoils and the fuselage. At maximum vehicle speed the segments are retracted to provide the greatest possible total area for the flow of air from the front to the rear of the vehicle, this air being pulled aft over the vehicle by the propellers operating at maximum thrust. At take-off or landing speed the segments are fully extended. In this configuration the reduced air mass flow, which corresponds to the reduced vehicle speed, is all forced to flow through the spaces between the outer surfaces of the airfoils and the tube wall. The total flow area being thus reduced roughly in proportion with vehicle speed, the local air flows over the outer surfaces of the airfoils are sustained at sufficiently high velocities to maintain the required lift and guidance function. The group of ducts within each airfoil array, being disposed at a net zero angle of attack and being almost circumferentially closed as seen in the cross section FIGURE 2, do not create any significant lift in any direction, whether open or closed by the segments.

Take-off procedure starts with the vehicle at rest on its extended landing gear and with segments fully extended. Engine power is advanced to full thrust. When the vehicle has accelerated to take-off speed the landing gear is retracted leaving the vehicle airborne. Now the segments are retracted slowly, thereby progressively reducing drag and allowing the vehicle to accelerate to maximum or cruising speed and simultaneously maintaining sufficient lift at every speed during the acceleration.

Normal landing procedure consists of partially reducing power so that the propulsion system thrust is less than vehicle drag, causing the vehicle to begin deceleration. The segments are gradually extended to cause further deceleration and simultaneously maintain sufficient lift to keep the vehicle airborne. When the segments reach the fully extended position and the vehicle decelerates to landing speed, the landing gear is extended to support the vehicle below minimum flying speed. Engine power is now reduced to zero thrust and the vehicle coasts or is braked to a stop. Alternatively, the aerodynamic propulsion system can be used in the reverse thrust mode for aerodynamic braking.

To stop the vehicle in the shortest possible distance the segments are fully extended as rapidly as possible. This chokes the air flow around the vehicle so that the vehicle momentum is transferred to the column of air fore and aft of the vehicle which in this case tends to move with the vehicle. At maximum landing speed the landing gear is extended, the propulsion system is set for maximum reverse thrust and wheel brakes, if any, can be applied.

The airfoil arrays will, as described, at all times strive to center each end of the vehicle within the tunnel track and will produce the lateral accelerating forces necessary to cause the vehicle to follow around curves in the track in either horzontal or vertical planes. In accordance with the present invention, the vehicle can be made to assume automatically the properly coordinated bank angle i.e. roll about its longitudinal axis, to accommodate any lateral curve at any velocity. The center of gravity of the vehicle is arranged below it longitudinal axis so that as the vehicle moves into a horizontal curve a rolling moment is established about its longitudinal axis which causes the vehicle to roll or bank. The higher the forward velocity or the smaller the radius of the turn, the larger the angle of roll will be. Thus the vehicle need not attain a precise predetermined velocity in order to negotiate a turn comfortably or in a coordinated manner, differing in this respect from conventional dual-track vehicles. The vehicle is said to negotiate a turn in a coordinated manner because it rolls automatically to the angle of bank which aligns the center of gravity to centerline axis, with the vector sum of the acceleration due to gravity plus the vertical plane curvilinear acceleration vector plus the horizontal plane curvilinear acceleration vector. The passengers necessarily roll with the vehicle and are subject to the total acceleration vector but because this vector is always essentially perpendicular to the floor of the vehicle the passengers are not thrown toward either side of their seats. Thus the term "coordinated" as used herein has the same meaning as is commonly accepted in aeronautical technology. Also, the vehicle may come to rest in what would normally be a high-speed turn without assuming a bank angle, again differing from conventional dual-track vehicles in which built-in bank angles are essential in the track. In other words, the present invention affords an infinite range of bank angles and the vehicle automatically assumes the correct angle without specific instructions from the vehicle operator. Moreover, the operator does not guide the vehicle in the conventional aircraft sense, there being no servocontrol loop in the operation of the system which requires a function by the operator or any mechanical substitute.

Boundary layer effects along the aft end of the fuselage can be minimized in accordance with the present invention by providing an annular air inlet duct or scoop means 23 for the turbine 15. In the illustrated arrangement this duct is located rearwardly of the aft airfoil array 19b, although it will be understood that the boundary layer can also be removed from the diffuser cone or tapered afterbody portion of the vehicle by means of porous or slotted diffuser cone walls. Removal of the boundary layer improves the efficiency of conversion of the air velocity head into static pressure at the aft end of the vehicle to minimize pressure drag, thereby affording more efficient operation.

In one preferred experimental wind tunnel model the ratio of tunnel track diameter to fuselage diameter was 1.5 to 1. The airfoil segments each had an aspect ratio i.e. the ratio of airfoil segment span (distance across fence tips) to airfoil segment cord (distance from leading edge to trailing edge), of 0.68 and a projected span slightly less than the fuselage diameter. Wingtip fences were used to minimize wingtip vortex losses. The airfoil segments were mounted on the fuselage with the outside horizontal and vertical dimensions across the trailing edges measuring 1.4 fuselage diameter. Assuming a tunnel track inside diameter base of 12.5 feet and a fuselage diameter of 8.33 feet, a vehicle velocity of approximately 260 m.p.h. is theoretically attainable before airflow past the fuselage becomes choked. Other ratios can, of course, be used to achieve differing theoretical maximum velocities.

The girthwise curvature of the trailing edge of each airfoil segment was formed to a radius equal to the radius of the cross section of the tunnel track. This construction, combined with the axially disposed outer edges of the wingtip fences, and cooperating with the adjacent portion of the tunnel wall, forms a chamber under the lower airfoil segment which has an opening only in the forward direction at minimum flying speed. Minimum flying speed, as related to this vehicle, is defined as that speed below which the fences and trailing edge of the lower airfoil segment would touch the bottom of the tunnel and above which speed the fences and trailing edge will have a finite clearance above the bottom of the tunnel. The chamber being open only in the forward direction at minimum flying speed, the pressure within this chamber will be equal to the aerodynamic stagnation pressure induced by the forward velocity of the vehicle through the air mass within the tunnel. This pressure acts upwardly under the lower or outer surface of the lower airfoil segment. Acting in opposition to this upward thrust force is a downward thrust force due to air pressure acting downwardly on the upper or outer surface of the top airfoil segment. This downward pressure, however, is substantially less than stagnation pressure because the airmass flowing over the upper airfoil segment and through the relatively large upper segment trailing edge clearance is moving at a high velocity, its pressure therefore being reduced in accordance with the well known Bernoulli relation. The difference between these two pressures creates net lift. The containment of the maxium possible pressure (stagnation pressure) under the lower airfoil segment, which is accomplished by the above described construction, therefore results in maximum possible lift per unit airfoil area at minimum flying speed, which implies minimum airfoil area for a given weight of vehicle. Conversely, for a given vehicle weight and airfoil area, this construction results in the lowest possible minimum flying speed. In order to have the trailing edge radius of each segment equal to the radius of the tunnel wall and simultaneously have a practical running clearance between the trailing edges and the tunnel wall, the arc defining the trailing edge of each airfoil segment has its center disposed on the far side of the center of the fuselage. Thus the resulting arcs do not lie on a common circle, but rather lie so that the outer edges of the wing tip fences lie in a circle of lesser diameter than that of the tunnel, although the radius of each trailing edge arc is substantially equal to that of the tunnel.

In FIGURE 2 it will be observed that there are circumferential gaps between adjacent airfoil tip fences 25. The width of this gap is preferably about twice the maximum possible gap between the outer edge of the fence and the proximate tube wall. The function of these gaps is to isolate each airfoil segment aerodynamically from its adjacent segments so that circumferential components of airflow from the high pressure region under the lower airfoil, for instance, will not flow into the space between the outer surface of an adjacent airfoil and its proximate tube wall to upset the yaw stability of the vehicle. The airfoil tip gaps therefore act as communicating passages to dump the airfoil tip vortex flow into the annular duct spaces between the airfoil and fuselage where this flow will not appreciably influence the stability of the vehicle or the guidance function.

While the invention has been described having reference to one preferred arrangement thereof, it will be understood that it can take other forms and arrangements. The airfoil arrays can, for example, take the form of a continuous girthwise band or ring wing rather than being segmented in the manner shown. In such case it is preferred that barrier fences similar to the fences 25 be included at a number of circumferentially spaced points about the ring wing in order to minimize girthwise components of air flow and to augment the lift forces. Horizontal self-centering action is maintained in this case by increasing the pitch of the airfoil and/or the angle of the trailing edge flare. Airfoils can also be provided in segmental form in numbers other than four (as illustrated in the drawing) for each circumferential array. For example, one two or three segments can be used and need not necessarily be of identical design. If desired for the purpose of conforming to standard rail car clearances when the vehicle is operated in conventional rail tunnels on conventional railroad tracks, the airfoils can be made retractible. It will be understood also that the relative areas of the airfoil arrays on the fuselage are, in general, dependent upon the location of the center of gravity or weight distribution of the vehicle. In the illustrated embodiment, the relatively larger area of the rear airfoil array 19b sustains the major portion of the lift, the center of gravity being well aft of the longitudinal mid point of the vehicle because of the weight of the propulsion system. The relatively smaller area of the forward array provides the remainder of the lift. It will be understood, however, that adjustable aerodynamic trim surfaces can be used, if desired, to impart further stability to the vehicle, particularly in its rolling mode and that such trim surfaces can be automatically or manually controlled, all in accordance with conventional aerodynamic practice.

Also, while the segments 22 for regulating the flow of air between the airfoils and the fuselage have been illustrated as hinged wall portions, it will be understood that the function, which augments lift at low vehicle velocities, can take other forms and arrangements, such for example as pneumatic bladders inflatable to fill the toroidal space between the fuselage and the airfoils, or radial movable wall members can be used. Also, the same function can be achieved by moving the entire airfoil assembly axially of the fuselage to points of greater or lesser fuselage diameter. If it is desired to achieve relatively low landing and take-off speed i.e. minimum flying speeds without the use of movable barriers, the vehicle may of course be designed with larger fixed airfoil areas, although inherently larger drag forces would result.

Further, while the track has been illustrated in one preferred form as being of closed, circular cross section, ventilated as required, thereby affording the manifold advantages stated above, it can take other forms such, for example, as a portion of a circle, or as two segments of a circle, or as a rectangular walled tunnel, open or closed at the top, or as one or more upstanding, contoured guide member or members.

The invention should not therefore be regarded as limited except as defined in the following claims.

I claim:

1. An aerodynamic transport system comprising, in combination, continuous guidance and supporting track means defined by walls having horizontal and vertical components, a vehicle for operation on the track, means to propel the vehicle on the track axially thereof, and airfoil means carried by the vehicle and disposed, in operation, proximate the horizontal and vertical wall components but spaced therefrom, said airfoil means and walls generating, cooperatively, ground effect lift forces with vertical and horizontal components derived from the vehicle motion through the air mass, thereby to support the moving vehicle aerodynamically on the track in spaced relation thereto and to impart guidance forces to the vehicle.

2. The combination as set forth in claim 1, said vehicle including a fuselage and said airfoil means being spaced from the fuselage to define an air passage therebetween, and movable barrier means carried by the vehicle for adjustable movement into the space between the airfoil means and the vehicle, thereby to adjustably vary the ground effect lift forces.

3. The combination as set forth in claim 1, said guidance track means having, in transverse section, concavely rounded surfaces and said airfoil means having complementary, convexly rounded surfaces, whereby the vehicle can roll in the track on its longitudinal axis.

4. A transport system as set forth in claim 1, said airfoil means including axially extending, laterally projecting walls to minimize transverse components of air flow.

5. An aerodynamic transport system comprising in combination a continuous tubular track having a circular cross section and substantially uniform diameter, a vehicle mounted within the track to be enveloped thereby, means to propel the vehicle along the track, and airfoil means carried by the vehicle and curving girthwise thereabout to present their outer surfaces to the track in spaced relationship therewith, said airfoil means and tubular track cooperatively generating ground effect lift forces to suspend and guide the moving vehicle aerodynamically in the track in stable equilibrium under the influence of vehicle motion through the air mass.

6. A transport system as set forth in claim 5, each of said airfoils being mounted to the fuselage with its leading edge closer to the fuselage centerline than its trailing edge.

7. A transport system as set forth in claim 5, said airfoils including outwardly flared trailing edges.

8. A transport system as set forth in claim 5, said vehicle having a center of gravity disposed beneath the center line thereof, and spaced therefrom, whereby the veheicle is caused to roll on said axis as it negotiates lateral curves in the track, thereby to seek a degree of roll inclination which is a function of the degree of curvature of the track and the velocity of the vehicle.

9. A transport system as set forth in claim 5, including diffuser means at the trailing end of the fuselage, said means to propel the vehicle comprising an internal combustion engine, and air scoop means adjacent the diffuser means to feed air to the engine and to remove the boundary air layer.

10. A transport system as set forth in claim 5, including support means to movably support the vehicle on the track in the absence of aerodynamic suspension by said airfoil means.

11. A transport system as set forth in claim 5, said vehicle including an elongated fuselage of substantially lesser diameter than said track, said airfoil means including airfoils substantially enveloping said fuselage fore and aft thereof and defining airflow paths between their inner surfaces and the fuselage surface as well as flow paths between their outer surfaces and the track.

12. A transport system as set forth in claim 11, including movably supported barrier means on said vehicle adapted to adjustably eclipse the flow path between the airfoils and the fuselage, thereby to vary the ground effect lift forces.

13. In an aerodynamic transportation system in which a vehicle moves along a track including concave working surfaces having vertical and horizontal components, the vehicle being aerodynamically supported and guided by the track, the invention comprising: a vehicle having a fuselage, airfoil means carried by said fuselage and extending at least partially around the fuselage to present horizontal and vertical airfoil components adapted to co-act with complementary track components to establish ground effect lift forces both horizontally and vertically said airfoil means including axially extending, radially projecting walls to minimize circumferential components of airflow, and support means to movably support the vehicle in the absence of aerodynamic suspension by said airfoil means.

14. A vehicle as set forth in claim 13, said airfoils being spaced from the fuselage to define an air flow path therebetween, and movable barrier means to adjustably eclipse the air flow path between the airfoil means and the fuselage.

15. A vehicle as set forth in claim 13, said airfoils including outwardly flared trailing edges.

16. A vehicle as set forth in claim 13, said airfoil means being disposed about the fuselage on the top, bottom, and both sides.

17. An aerodynamic transport system comprising in combination a continuous tubular track having a circular cross section and substantially uniform diameter, a vehicle mounted within the track to be enveloped thereby, means to propel the vehicle along the track, and airfoil means carried by the vehicle and curving girthwise thereabout to present their outer surfaces to the track in spaced relationship therewith, said airfoil means comprising a plurality of circumferentially spaced apart airfoil segments defining circumferential gaps for the passage of air from airfoil tip vortices thereby to aerodynamically isolate adjacent airfoil segments, said airfoil means and tubular track cooperatively generating ground effect lift forces to suspend and guide the moving vehicle aerodynamically in the track in stable equilibrium under the influence of vehicle motion through the air mass.

18. A transport system as set forth in claim 17 the trailing edge radius of curvature of each airfoil segment being substantially equal to the radius of curvature of the tunnel, the respective centers of said radii of curvature being offset inwardly to cause the edges of the segments to lie in a common circle of lesser diameter than the tunnel.

References Cited in the file of this patent

UNITED STATES PATENTS

| 814,939 | Cerruti | Mar. 13, 1906 |
| 1,000,009 | Jenison | Aug. 8, 1911 |
| 1,411,597 | Trask | Apr. 4, 1922 |
| 2,511,979 | Goddard | June 20, 1950 |
| 3,006,288 | Brown | Oct. 31, 1961 |

OTHER REFERENCES

"A Text Book of Physics," by L. B. Spinney, The Macmillan Co., New York City, 1920, pages 152 to 156 inc.